(12) United States Patent
Anderson et al.

(10) Patent No.: US 7,469,707 B2
(45) Date of Patent: Dec. 30, 2008

(54) IRRIGATION CONTROL VALVE AND SYSTEM

(75) Inventors: Noel W. Anderson, Fargo, ND (US); Mark W. Stelford, Sycamore, IL (US)

(73) Assignee: Deere & Company, Moline, IL (US)

( * ) Notice: Subject to any disclaimer, the term of this patent is extended or adjusted under 35 U.S.C. 154(b) by 406 days.

(21) Appl. No.: 11/444,691

(22) Filed: Jun. 1, 2006

(65) Prior Publication Data

US 2007/0277879 A1 Dec. 6, 2007

(51) Int. Cl.
*F16K 17/36* (2006.01)
(52) U.S. Cl. ............ 137/78.3; 137/614.16; 137/614.21; 251/212; 239/64
(58) Field of Classification Search ................ 137/78.1, 137/78.2, 78.3, 613, 614.16, 614.21; 324/664; 239/63, 64; 73/73; 251/212
See application file for complete search history.

(56) References Cited

U.S. PATENT DOCUMENTS

| | | | | |
|---|---|---|---|---|
| 3,874,590 | A | 4/1975 | Gibson | 239/63 |
| 3,898,843 | A | 8/1975 | Waterston | 61/13 |
| 4,055,200 | A | 10/1977 | Lohoff | |
| 4,128,357 | A | 12/1978 | Barth et al. | 404/41 |
| 5,870,302 | A | 2/1999 | Oliver | 364/140.1 |
| 6,397,162 | B1 | 5/2002 | Ton | 702/136 |
| 6,452,499 | B1 | 9/2002 | Runge et al. | 340/601 |
| 6,782,310 | B2 | 8/2004 | Bailey et al. | 700/284 |
| 6,823,239 | B2 | 11/2004 | Sieminski | 700/284 |
| 6,853,883 | B2 | 2/2005 | Kreikemeier et al. | 700/284 |
| 6,874,707 | B2 | 4/2005 | Skinner | 239/542 |
| 6,898,467 | B1 | 5/2005 | Smith et al. | 700/20 |
| 6,921,360 | B2 | 7/2005 | Banik | 600/30 |
| 6,940,211 | B2 | 9/2005 | Pelrine et al. | 310/330 |
| 6,947,810 | B2 | 9/2005 | Skinner | 700/283 |
| 2003/0124009 | A1 | 7/2003 | Ravi et al. | 417/572 |
| 2004/0068220 | A1 | 4/2004 | Couvillon, Jr. et al. | 604/6.11 |
| 2004/0139650 | A1 | 7/2004 | Haq | |

FOREIGN PATENT DOCUMENTS

| | | |
|---|---|---|
| CA | 2446843 A | 4/2005 |
| DE | 3743796 A | 7/1989 |
| DE | 19527764 A | 1/1996 |
| WO | WO 2004/040415 A | 5/2004 |
| WO | WO 2006/004985 A | 1/2006 |

*Primary Examiner*—John Rivell
*Assistant Examiner*—Craig M Schneider

(57) ABSTRACT

An irrigation control valve has two movable members that can independently or in combination block the flow of water in a conduit, or be fully retracted of at some point in-between. A moisture sensitive element is arranged to be placed in contact with the soil and expands or retracts dependent on the moisture within soil adjacent the moisture sensitive element. The moisture sensitive element is connected or coupled to a moisture controlled member. Dependent on the moisture of the soil adjacent the moisture sensitive element, the moisture controlled member is moved further into the conduit with increasing moisture in the soil. The moisture controlled member and an electronically controlled member are located adjacent each other at the conduit. The electronically controlled member determines how far the moisture controlled member needs to move in order to fully block the flow of water in the conduit. An electronic controller is operable to determine the achieved level of moisture in the soil, by means of the electronically controlled actuator and the electronically controlled member.

24 Claims, 4 Drawing Sheets

IRRIGATION CONTROL VALVE AND SYSTEM

FIELD OF THE INVENTION

The present invention relates to agricultural and landscape irrigation, and more specifically, an irrigation control valve and system for irrigating plants.

BACKGROUND OF THE INVENTION

Increasing scarcity and cost of water is driving advances in irrigation. In California and Australia, for example, wine growers are now utilizing techniques such as root deficit irrigation (RDI) and partial root zone drying (PRD). The grapevines are hence irrigated with less water than in conventional viniculture. These techniques not only save water, but can increase the value of the crop by improving crop attributes for which the market will pay a premium. These techniques will reach maximum effectiveness when irrigation can be economically controlled on a plant-by-plant basis.

Another advance in irrigation is the deployment of wireless sensor networks to enhance crop management. One of the challenges to this approach is the cost of the network nodes and the energy they require for communication, especially for powering electro-mechanical actuators such as irrigation valves.

Thus, there is a need for an automatic irrigation system that controls irrigation of one or more plants according to their actual moisture requirements, but also allowing a remote or environmental dependent adjustment of the desired or achieved moisture level. The valve of the irrigation system should have low requirements for electric energy and a low price.

It is an object of the present invention to provide for low cost, individual or small group plant water control that is preferably suited for supporting RDI and PRD techniques.

SUMMARY OF THE INVENTION

An irrigation control valve has two movable members that can independently or in combination block the flow of water in a conduit, or be fully retracted or at some point in-between. A moisture sensitive element is arranged to be placed in contact with the soil, and expands or retracts dependent on the moisture within soil adjacent the moisture sensitive element. The moisture sensitive element is connected or coupled to a moisture controlled member. Dependent on the moisture of the soil adjacent the moisture sensitive element, the moisture controlled member is moved further into the conduit with increasing moisture in the soil. Analogously, the moisture controlled member is moved further out of the conduit as the soil dries. The second movable member is an electronically controlled member coupled or connected to an electronically controlled actuator. The latter is controlled by an electronic controller.

The moisture controlled member and the electronically controlled member are located adjacent each other at the conduit. The electronically controlled member determines the shut-off position of the moisture controlled member, i.e. how far the moisture controlled member needs to move in order to fully block the flow of water in the conduit. The electronic controller is thus operable to determine the achieved level of moisture in the soil, by means of the electronically controlled actuator and the electronically controlled member.

It is an advantage of the invention that the electronically controlled member and the electronically controlled actuator need only to move when a desired level of moisture in the soil changes. Since this usually takes place over longer intervals, minimal electric energy for moving the electronically controlled member is required. Changes in the actual moisture content of the soil occurring with higher frequency, dependent on the daytime evaporation, etc., only influence the moisture controlled member which does not require electric energy.

The electronic controller can be controlled from a remote station at which a computer is located. A user can input data containing information about the desired amount of moisture in the ground into the computer, which data are sent to the electronic controller wirelessly by radio frequency transmission or via a wired control network. The information about the desired amount of moisture in the ground can alternatively or additionally be provided by a control program running on the computer and/or on the controller of the irrigation valve, the program using a model based upon plant characteristics and environmental information.

DESCRIPTION OF THE PREFERRED EMBODIMENT

Figure 1:
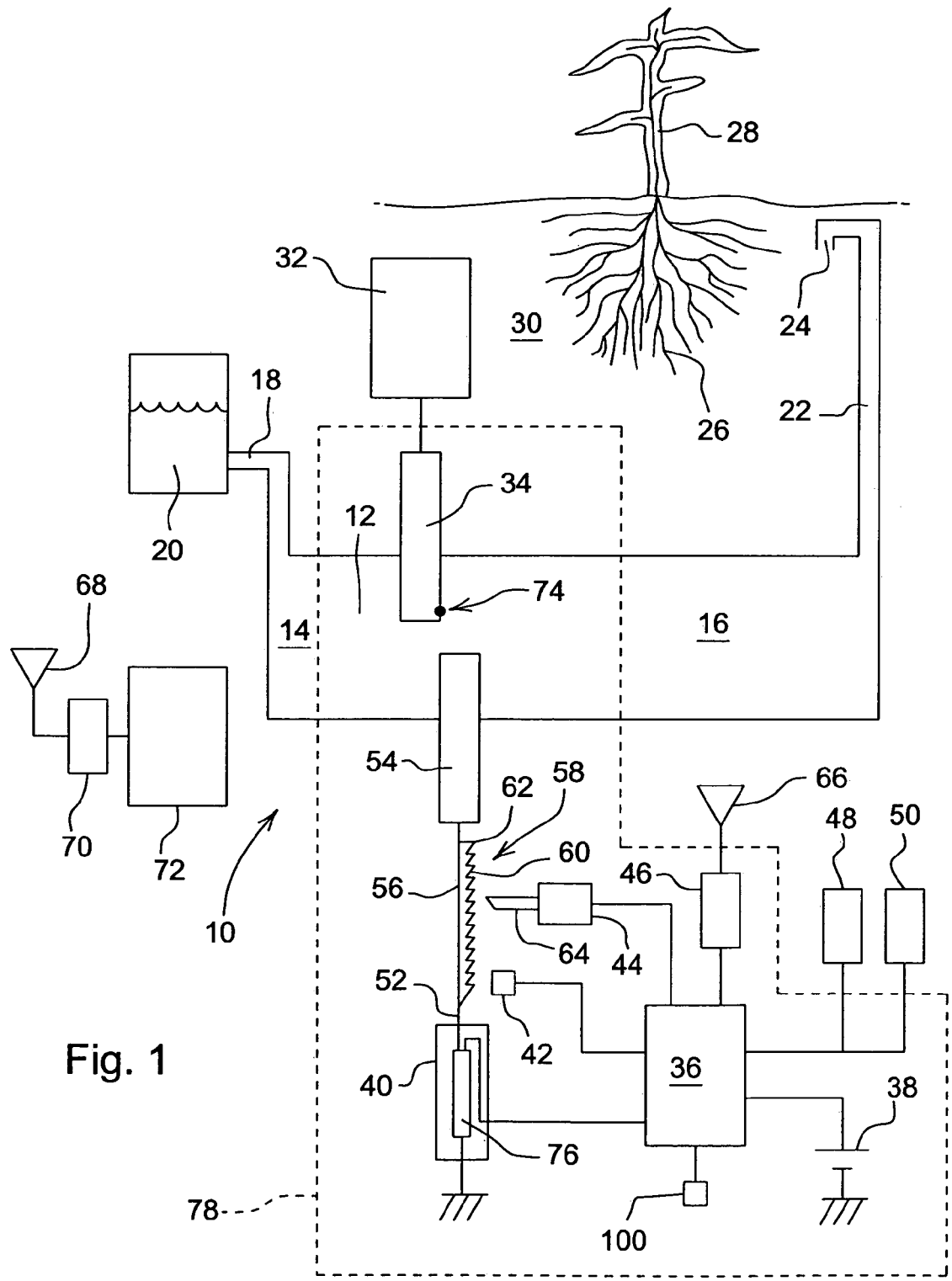
FIG. 1 is a schematic representation of an irrigation system incorporating an irrigation control valve according to the invention.

In FIG. 1, an irrigation control system according to the invention is shown in a schematic manner. The irrigation control system utilizes an irrigation control valve 10 comprising a conduit 12 having an inlet 14 and an outlet 16. The cross section of conduit 12 can be circular or rectangular or of any other suitable shape. Inlet 14 is connected via an inlet pipe 18 to a supply 20 of water. The supply 20 can be any suited source of water, especially a tank or cistern standing upon the ground or buried therein collecting rainwater or any other water, a lake, a spring or a water-conducting layer in the ground. A pump (not shown) can be provided between the supply 20 and the inlet 14, if required. The outlet 16 is connected by means of an outlet pipe 22 to a water discharge 24 located in the vicinity of roots 26 of a plant 28, for example a vine plant. The roots 26 are within soil 30 surrounding them.

The irrigation control valve 10 comprises a moisture sensitive element 32 located within the soil 30 adjacent the water discharge 24 and the roots 26. The moisture sensitive element 32 consists of or incorporates a hydrophilic material, such as a hydrophilic polymer or nylon or wood, which expands as a function of the amount of moisture in the soil 30 surrounding the moisture sensitive element 32. The more moisture the soil 30 adjacent the moisture sensitive element 32 contains, the larger the latter gets. Analogously, the moisture sensitive element 32 contracts with decreasing moisture of the soil 30 surrounding it. A membrane permeable to water, but impermeable to salt and other chemicals such as fertilizer may be needed to maintain the quality and function of the hydrophilic polymer in areas where irrigation water has high salt content or if irrigation water is used for chemigation.

Moisture sensitive element 32 is mechanically coupled to a movable moisture controlled member 34 that penetrates into the conduit 12 between inlet 14 and outlet 16. The moisture sensitive element 32 controls the position of the moisture controlled member 34 dependent on the moisture of the soil 30 in the vicinity of the moisture sensitive element 32. In particular, it moves the moisture controlled member 34 further into the conduit 12 the higher the moisture level of the soil 30 is, such that the cross section in the conduit 12 left free by the moisture controlled member 34 increases with decreasing humidity of the soil 30 and vice versa.

Irrigation control valve 10 further comprises an electronic controller 36 connected to an electric power source 38 (such as a battery, solar cell, ultracapacitor, fuel cell, or a motion-to-electricity unit, etc.), an electronically controlled actuator 40, a position sensor 42, a ratchet arresting actuator 44, a transceiver 46, and two environmental sensors 48 and 50. The electric power source 38 powers the electronic controller 36 and the sensors 42, 48 and 50, as well as the transceiver 46. Actuators 40 and 44 are powered from the electric power source 38 once activated by the electronic controller 36. Controller 36 can use a microprocessor or a microcontroller.

The electronically controlled actuator 40 is a linear actuator having a linearly moving output 52. In the embodiment shown in FIG. 1, the electronically controlled actuator 40 comprises an electro-active polymer 76 that expands in the presence of an electric field provided by the electronic controller 36 and contracts when the electric field is removed. In another possible embodiment (not shown), the electronically controlled actuator 40 comprises a DC motor or another suitable bidirectional linear or rotational drive receiving a directional signal from the controller 36. The motor or drive can have a rotating output driving a pinion or worm gear meshing with a toothed bar that is connected to output 52. Output 52 is mechanically coupled to a movable member 54 by means of a rod 56. Rod 56 carries a toothed portion 58 having a number of recesses 60 between adjacent teeth 62.

A ratchet 64 connected to the ratchet arresting actuator 44 is suited to be moved between a locking position in which it penetrates into a recess 60 and a released position, as shown in FIG. 1, in which it is moved out of the recesses 60 by the arresting actuator 44. The latter is a linear actuator, and incorporates in a possible embodiment a solenoid (not shown) operable to pull a magnetic core coupled to the ratchet 64 against force of a spring, such that the ratchet 64 gets out of the respective recess 60.

Arresting actuator 44 and electronically controlled actuator only need electric power when the electronically controlled member 54 is moving. The latter can be brought into a rather large numbers of positions between a position leaving conduit 12 entirely open and a closing position in which it closes the conduit 12.

If the electro-active polymer 76 consumes no or sufficiently little power when the field voltage upon the polymer 76 is held constant, one could also dispense with the ratchet 64 and the arresting actuator 44. The latter are however required if the electronically controlled actuator 40 comprises a DC motor or another suitable bidirectional rotational drive, unless the drive train between the motor and the output 52 is self arresting, by for example using a worm gear meshing with a pinion.

Position sensor 42 is in one embodiment of the invention an optical sensor detecting markings on rod 56. It submits data containing information about the actual position of output 52 and thus of the electronically movable member 54 to electronic controller 36. In another embodiment, position sensor 42 can use a potentiometer moved by the electronically controlled actuator 40. If the electronically actuated actuator 40 comprises for example a stepper motor, one could dispense with sensor 42, since the position of the actuator 40 is known to the controller 36 from the control signals submitted to the actuator 40.

Transceiver 46 is connected to an antenna 66 that can receive electromagnetic waves from an antenna 68 connected to a transceiver 70 which communicates with a computer 72. Antenna 68, transceiver 70 and computer 72 are located at a remote location, e.g. at an operator's office. The communication line between electronic controller 36 and computer 72 via antennae 66 and 68 is preferably bidirectional, such that error messages can be sent from the controller 36 to the computer 72, for example if the electrically movable member 54 is stuck in its position and cannot be moved by the electronically controlled actuator 40. The wireless communication link is preferably only requiring low power, such as using a Zigbee or RFID protocol, but one could also use cellular phone or WiMax connections.

Sensor 48 senses the temperature of the soil 30 in the vicinity of the plant 26, while sensor 50 is a sunlight sensor as sunlight has been identified as key to several plant (especially grape) key attributes. Temperature values can be used for calculating growing degree days for the plant 28 as determined by climate, microclimate and weather. Controller 36 is optionally connected to another sensor (not shown) measuring the moisture within the soil 30, either with a dedicated separate sensor or by measuring the position of the moisture sensitive element 32 or of the moisture controlled member 34 with a position sensor.

It should be noted that while in FIG. 1, all elements of the irrigation control valve 10 are shown as lying below the soil 30, however, at least antenna 66 and sensor 50 are usually located above the soil 30. All or a part of the remaining elements of the irrigation control valve 10, except for the moisture sensitive element 32 that should at least for its largest part be located within the soil 30, could however also be located above the soil 30. Most of the elements of valve 10, except the antenna 66, the sensors 48, 50 and the moisture sensitive element 32, are mounted in a preferably sealed housing 78.

Movable electronically controlled member 54 is located immediately downstream the moisture controlled member 34 on the opposite side of conduit 12. The electronically controlled member 54 and the moisture controlled member 34 are thus entering the conduit 12 from opposite sides and cooperate to open and close the conduit 12 to open and shut off the water flow. This can be achieved by positioning the adjacent faces of the electronically controlled member 54 and the moisture controlled member 34 in a common plane (as shown in FIGS. 2 to 5), or by providing at least one of the electronically controlled member 54 and the moisture controlled member 34 with a projecting sealing element 74 arranged to touch the adjacent face of the other member 34, 54 as shown in FIG. 1.

In another possible embodiment, both the electronically controlled member 54 and the moisture controlled member 34 are located within a common plane and enter to conduit 12 from opposite sides, such that they can engage each other within the conduit 12 to close it. In this embodiment, at least one of the electronically controlled member 54 and the moisture controlled member 34 can be connected to its respective actuator 32, 40 by means of a resilient means like a spring or a lost motion connection for sake of protecting the respective actuators 32, 40 when they abut each other.

Figure 2:
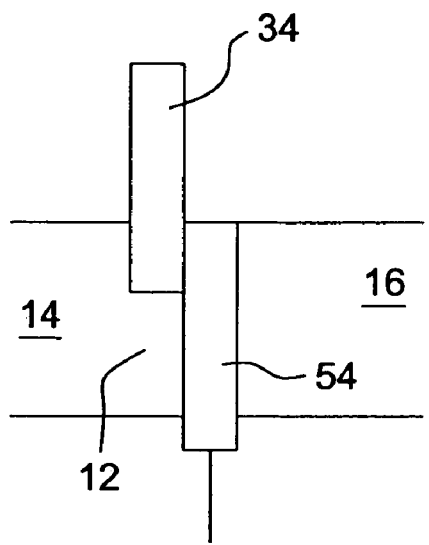
FIG. 2 is a schematic representation of the members of the valve, wherein the electronically controlled member is in a closing position and the moisture controlled member is in a partially open position.
Figure 4:
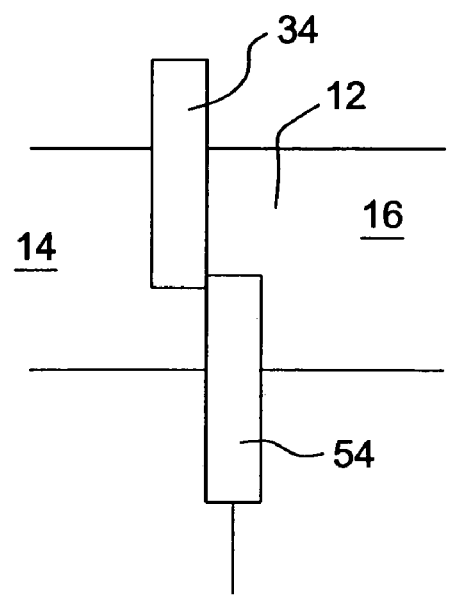
FIG. 4 is a schematic representation of the members of the valve, wherein the electronically controlled member is in a partially open position and the moisture controlled member is in a partially open position, such that the valve is closed.
Figure 3:
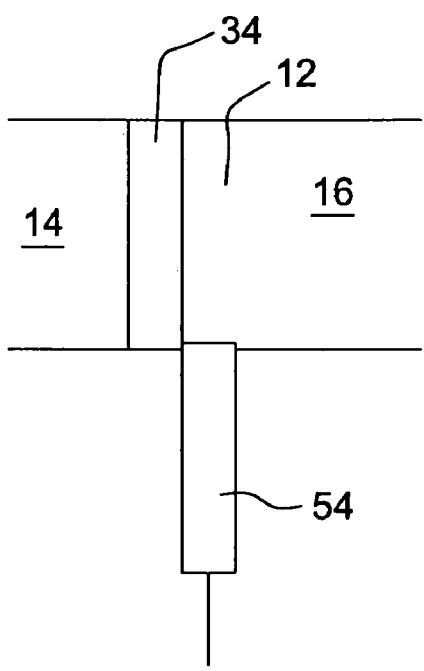
FIG. 3 is a schematic representation of the members of the valve, wherein the electronically controlled member is in an open position and the moisture controlled member is in a closed position.

FIGS. 2 to 5 show different possible positions of the electronically controlled member 54 and the moisture controlled member 34. In FIG. 2, electronically controlled member 54 closes the conduit 12 entirely, while moisture controlled member 34 leaves ⅔ of the conduit 12 open. In FIG. 3, electronically controlled member 54 leaves the conduit 12 entirely open, while moisture controlled member 34 closes the conduit 12. In FIG. 4, electronically controlled member 54 leaves a little more than ⅔ of the conduit 12 open, while moisture controlled member 34 closes a little more than ⅔ of the conduit 12. Hence, in all of FIGS. 2 to 4, no water will get from the inlet 14 to the outlet 16.

Figure 5:
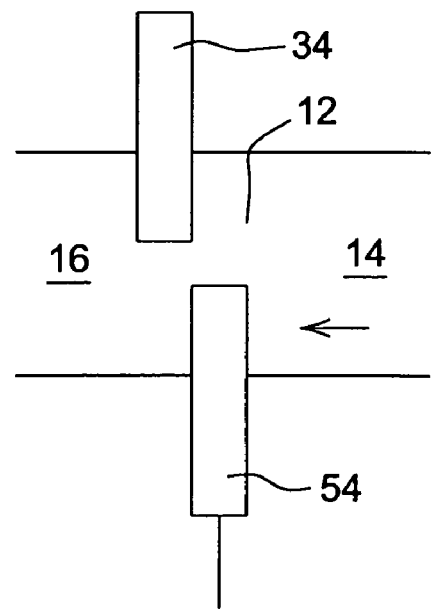
FIG. 5 is a schematic representation of the members of the valve, wherein the electronically controlled member is in a partially open position and the moisture controlled member is in a partially open position, such that the valve is open.

In FIG. 5, electronically controlled member 54 closes about ⅓ of the conduit 12, while moisture controlled member 34 also closes ⅓ of the conduit 12. Thus, water will flow from inlet 14 to outlet 16. In the embodiment of FIG. 5, the position of inlet 14 and outlet 16 was exchanged, in order to demonstrate that the relative position of electronically controlled member 54 and moisture controlled member 34 can be arbitrarily selected.

It is apparent that electronically controlled member 54 defines the position where moisture controlled member 34 closes the conduit 12 (shut-off position), and thus how much it needs to travel from an position leaving the conduit 12 open to close the conduit 12, and how much it needs to move from a closing position to open the conduit 12 when the soil 30 is dry. Hence, the achieved moisture level of the soil 30 surrounding the moisture sensitive element 34 is defined by the position of the electronically controlled member 54.

In operation, electronic controller 36 obtains information about a desired level of moisture in the soil 30 at the roots of plant 28 from computer 72 via transceiver 70, antennae 68, 66 and transceiver 46. This information is combined with data from sensors 48 and 50 to calculate a desired position of the electrically movable member 54. Controller 36 then activates the arresting actuator 44 to release ratchet 64 from its recess 60 and controls, using the signals from position sensor 42, and then commands the electronically controlled actuator 40 to move the output 52 into a position corresponding to the desired position of the electronically controlled member 54. The roots 26 of plant 28 are thus irrigated with a desired amount of water. Once the desired moisture of soil 30 is achieved, moisture sensitive element 32 expands and moves the moisture controlled member 34 into a position in which it (in cooperation with the electrically controlled member 54) closes the conduit 12.

Figure 6:
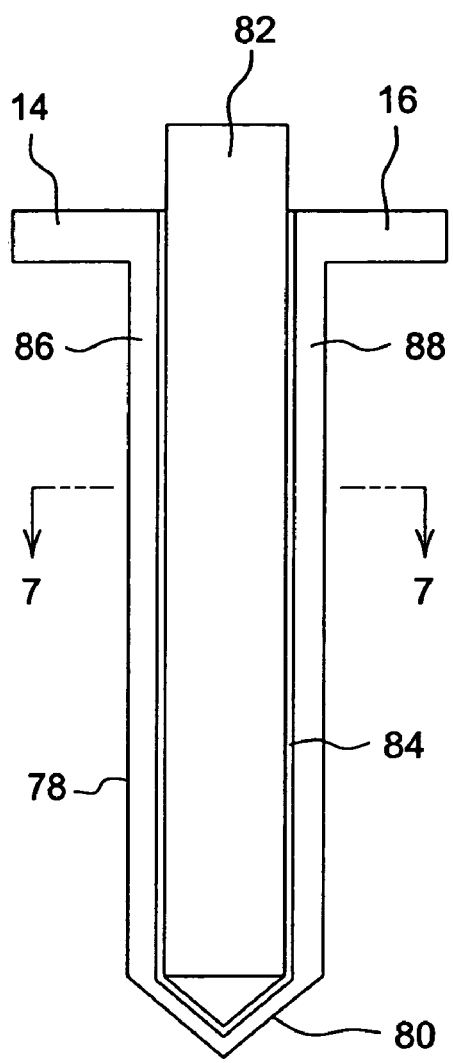
FIG. 6 is a sectional side view of an embodiment of the irrigation control valve.
Figure 7:
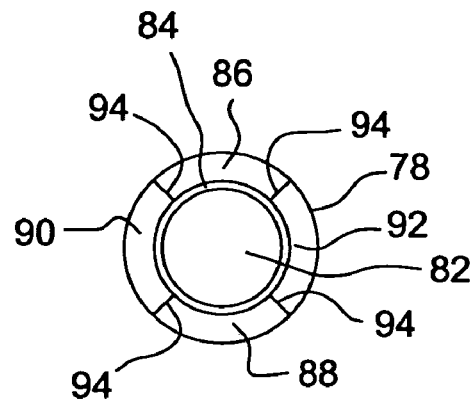
FIG. 7 is a sectional view of the irrigation control valve along lines 7-7 of FIG. 6.
Figure 8:
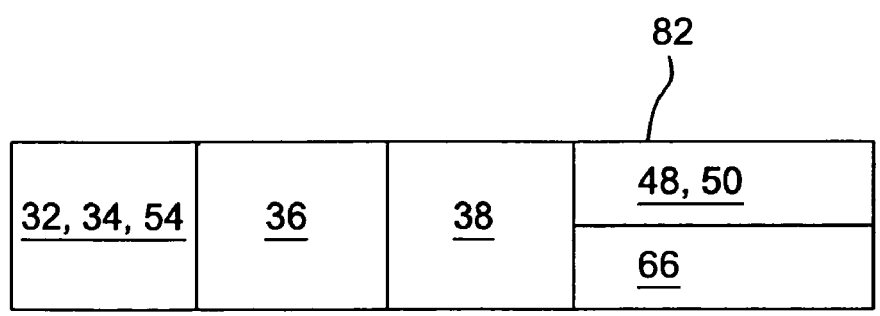
FIG. 8 is a sectional view of the removable cartridge of the irrigation control valve of FIG. 6.

A preferred embodiment of the valve 10 is shown in FIGS. 6 to 8. FIG. 6 shows a sectional side view of the valve 10, while FIG. 7 represents a horizontal section through the valve 10 along lines 7-7 of FIG. 6.

The housing 78 is cylindrical and has a point 80 at its bottom end for easier insertion into the soil 30. Within the housing 78, a removable cartridge 82 is inserted into a central hollow part of housing 78 defined by an inner cylindrical wall 84. Inlet 14 and outlet 16 are on opposite sides on top of the housing 78. Between the outer circumference of the housing 78 and the inner wall 84, four chambers 86, 88, 90, and 92 are defined by separating walls 94. Cartridge 82 supports an easy exchange of the members 34 and 54 and/or of the power source 38 for maintenance purposes.

Chamber 86 is connected to inlet 14 and allows the incoming water to get down to the lower part of the cartridge 82 in which the moisture controlled member 34 and the electronically controlled member 54 are located. The inner wall 78 defining chambers 86 and 88 thus ends above point 80 to allow water from chamber 86 to get to the bottom of the cartridge 82 and from the cartridge 82 to chamber 88.

Chamber 88 is located on the opposite side of chamber 86 and allows water to stream upwardly from the moisture controlled member 34 and the electronically controlled member 54 to the outlet 16.

The chambers 90 and 92 are penetrable for moisture, such that moisture can travel between the soil 30 and the moisture sensitive element 32. In the cartridge 82, the electronic controller 36 is located above the moisture sensitive element 32, the moisture controlled member 34 and the electronically controlled member 54. Above the controller, the power source 38 is located, while the sensors 48, 50 and the antenna 66 are provided above the power source 38.

The controller 36 could also be connected to a display (not shown). A display requiring only little electrical power is preferred, i.e. the power should only be used in changing the display, not in maintaining it. This may be a simple two state display (on-off) tied to a system attribute or may be alphanumeric display using preferably a cholesteric liquid crystal displays.

Controller 36 can comprise a self-localizing means (not shown). The integrated localization engine geo-referencing the controller 36 in the field can be used to help localized harvest containers. Software on the controller can implement a security means to ensure that only authorized control commands are downloaded and considered, and optionally, that software used to generate those commands have come from a valid source (i.e., subscription fee has been paid).

It is apparent that an irrigation system is normally not used only for a single plant 28, but for a plurality of plants standing on a field, in a vineyard, or a garden. In order not to need one irritation valve 10 for only one plant 28, it would be possible to connect a number of water exhausts 24 to the outlet 16 of one irrigation valve 10 for cost reduction. Alternatively or additionally, a single controller 36 could perform processing for number of electrically controlled members 54.

To implement PRD in a vineyard, or with another crop, one irrigation control valve 10 would be provided for the each of the two halves of the root zone to be managed. The electronically controlled member 54 of the first irrigation control valve 10 could be positioned in an open position to enable a water flow to its half of the roots, while the electronically controlled member 54 of the second irrigation control valve 10 could be positioned in a closed position to shut of the water flow to its half of the roots. At some point of time, the two settings would be exchanged.

It would also be possible to use a number of more intelligent irrigation control valves 10 as shown in FIGS. 1 and 6 to 8 having a number of environmental sensors 48, 50 together with a much larger number of irrigation valves 10 with less or without any environmental sensors. Those irrigation valves would receive data from the more intelligent irrigation control valves 10 via transmitters 46 and antennae 66. This reduced number of environmental sensors 48, 50 is possible because some environmental attributes, such as sunshine, will hardly vary much over a field. Others, such as temperature, would vary over several field microclimates. Thus, it would be advisable to provide a rather high number of irrigation control valves 10 with a temperature sensor 48, but only some of them with a sunlight sensor 50. Soil moisture may be a localized phenomenon, since the actual variability may be highly correlated with soil type and topography variability. Hence, each irrigation control valve 10 incorporates a moisture sensitive element 32 as shown in the attached drawings. In a simpler embodiment, the controller 36 is neither connected to an environmental sensor 48, 50 nor to a transceiver 44, but it controls the actuator 40 only based upon a signal from a clock 100 dependent on the daytime and date.

Figure 9:
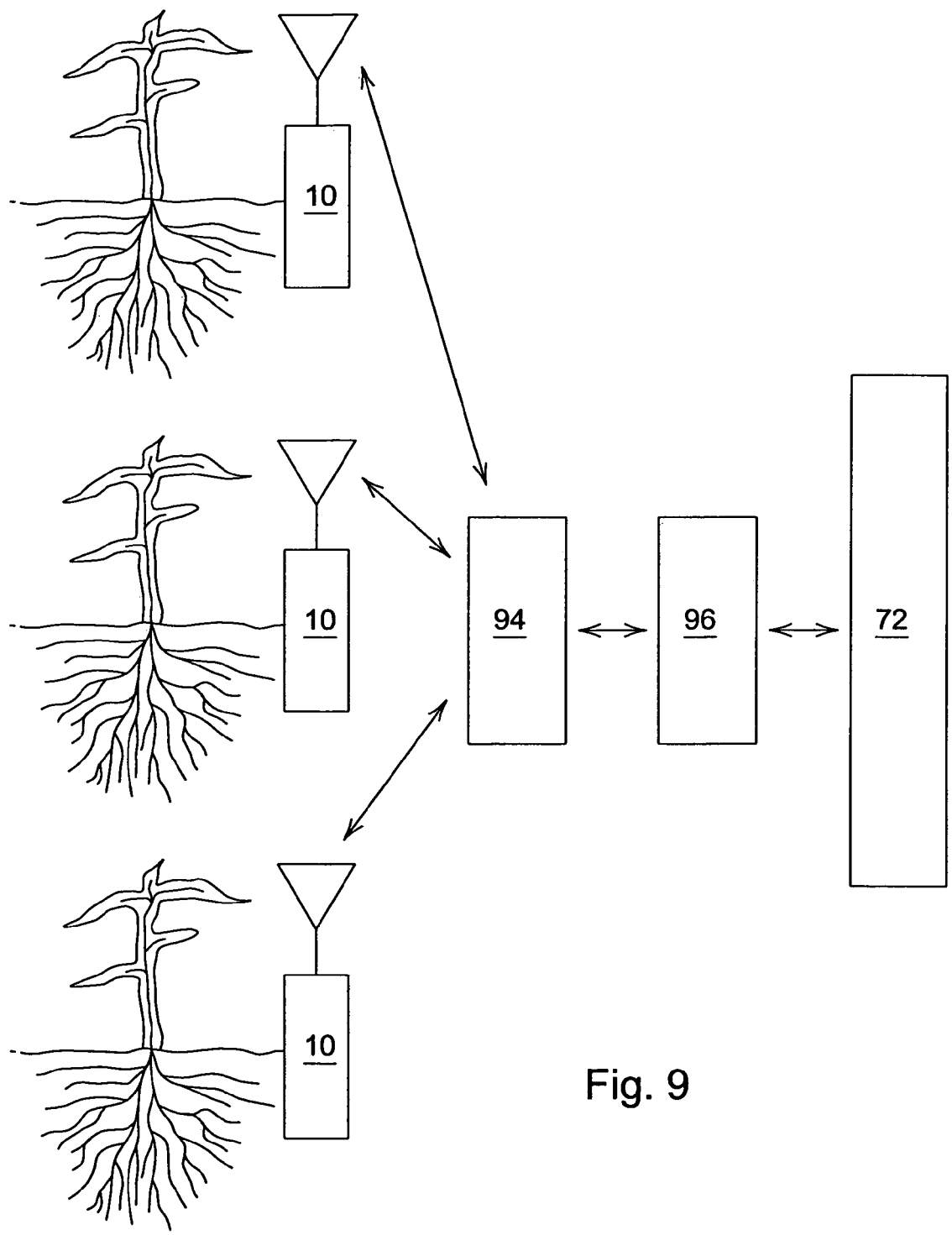
FIG. 9 is a schematic representation of an irrigation system with a plurality of irrigation control valves and a communication node in the field.

An irrigation control valve 10 can communicate with computer 72 directly via the transceivers 46, 70 and antennae 66, 68, as shown in FIG. 1. In another embodiment, as shown in FIG. 9, a separate communication node 94 is installed in the field, communicating preferably via a global communications infrastructure such as cellular phone, the internet, etc., with another communication node 96 connected to the computer 72. The communication node 94 in the field would communicate with the controllers 36 of the irrigation control valves 10 preferably via a short range field communication system using the antennae 66 and transceivers 46 shown in FIG. 1.

The information exchanged between the irrigation control valves 10 and the communication node 94 installed in the field, or some subset or summary, would be received by the computer 72 that is used as a back office management system. The latter would thus receive information on the sunlight, temperature, position of the electronically controlled member 54 and of the moisture controlled member 34. The data may be time stamped and geo-referenced as described previously. This data is used to develop a database of past and current field conditions in the computer 72. The current field conditions and trends, possibly supplemented with field scouting reports, are used with business, weather, and crop models to generate a site-specific irrigation plan. This plan, in the form of instructions to the controllers 36, is communicated from the computer 72 through the communication nodes 94, 96 to the controllers 36 of the irrigation control valves 10. The controller instructions are addressed to individual controllers 36 and include instructions such as where and when to set the electronically controlled member 54. With respect to the communication hardware and protocol, reference is made to U.S. application Ser. No. 11/348,918, the contents of which incorporated herein by reference.

Having described the preferred embodiment, it will become apparent that various modifications can be made without departing from the scope of the invention as defined in the accompanying claims.

The invention claimed is:

1. An irrigation control valve, comprising:
   a conduit having an inlet and an outlet;
   a moisture sensitive element adapted to be placed in contact with the soil, the moisture sensitive element being expansible as a function of the amount of moisture adjacent the moisture sensitive element;
   a movable moisture controlled member coupled to the moisture sensitive element and configured to variably restrict the cross section of the conduit between the inlet and the outlet dependent on the moisture adjacent the moisture sensitive element, the cross section of the conduit at the moisture sensitive element decreasing with increasing moisture adjacent the moisture sensitive element and increasing with decreasing moisture adjacent the moisture sensitive element;
   an electronically controlled actuator connected to an electronic controller;
   and a movable electronically controlled member coupled to the electronically controlled actuator, the electronically controlled member located at the conduit adjacent the moisture controlled member and cooperating with the moisture controlled member to define the shut-off position of the moisture controlled member.

2. An irrigation control valve according to claim 1, wherein the electronically controlled member is arranged one of upstream and downstream the moisture controlled member.

3. An irrigation control valve according to claim 1, wherein the moisture controlled member and the electrically controlled member are arranged on opposite faces of the conduit.

4. An irrigation control valve according to claim 1, wherein the moisture sensitive element comprises a hydrophilic polymer.

5. An irrigation control valve according to claim 1, wherein the electronically controlled actuator is operable to hold the electronically controlled member into at least one intermediate position between an open position in which the electronically controlled member leaves the conduit open and a closed position in which the electronically controlled member closes the conduit.

6. An irrigation control valve according to claim 5, wherein the electronically controlled actuator is operable to hold the electronically controlled member into a plurality of intermediate positions between an open position in which the electronically controlled member leaves the conduit open and a closed position in which the electronically controlled member closes the conduit.

7. An irrigation control valve according to claim 5, wherein the electronically controlled actuator is operable to maintain the electronically controlled member in its respective position without requiring electronic power.

8. An irrigation control valve according to claim 7, wherein the electronically controlled actuator comprises a bi-directional drive and ratchet means.

9. An irrigation control valve according to claim 1, wherein the electronic controller is connected to least one of an environmental sensor for detecting at least one environmental condition, and a receiver operable to receive control data from a remote location.

10. An irrigation control valve according to claim 9, wherein the controller is connected to a position sensor for sensing the position of an output of the electrically driven element.

11. An irrigation control valve according to claim 9, wherein the electrically controlled actuator comprises an electro-active polymer that expands in the presence of an electric field and contracts when the field is removed.

12. An irrigation control valve according to claim 9, wherein the valve comprises a housing having a point at its bottom end, a chamber connected to the inlet, a chamber connected to the outlet, and a removable cartridge mounting the moisture sensitive element, the moisture controlled member, the electronically controlled member, the electronically controlled actuator, and the controller.

13. An irrigation system, comprising:
   a water conducting means connected to a supply of water,
   a control valve with
      a conduit having an inlet and an outlet, the inlet of the conduit connected to the water conducting means and the outlet of the conduit connected to a water discharge within or in the vicinity of a soil containing a root of at least one plant a moisture sensitive element in contact with the soil, the moisture sensitive element being expansible as a function of the amount of moisture in the soil adjacent the moisture sensitive element;

a movable moisture controlled member coupled to the moisture sensitive element and configured to variably restrict the cross section of the conduit between the inlet and the outlet dependent on the moisture in the soil adjacent the moisture sensitive element, the moisture sensitive element moving out of the conduit when the moisture in the soil adjacent the moisture sensitive increases and moving into the conduit when the moisture in the soil adjacent the moisture sensitive element decreases;

an electronically controlled actuator connected to an electronic controller;

a movable electronically controlled member coupled to the electronically controlled actuator, the electronically controlled member located at the conduit adjacent the moisture controlled member and arranged to define the shut-off position of the moisture controlled member, the electronic controller connected to least one of an environmental sensor for detecting at least one environmental condition, a clock, and a receiver operable to receive control data from a remote location.

14. An irrigation control system according to claim 13, wherein the electronically controlled member is arranged one of upstream and downstream the moisture controlled member.

15. An irrigation control system according to claim 13, wherein the moisture controlled member and the electrically controlled member are arranged on opposite faces of the conduit.

16. An irrigation control system according to claim 13, wherein the moisture sensitive element comprises a hydrophilic polymer.

17. An irrigation control system according to claim 13, wherein the electronically controlled actuator is operable to hold the electronically controlled member into at least one intermediate position between an open position in which the electronically controlled member leaves the conduit open and a closed position in which the electronically controlled member closes the conduit.

18. An irrigation control system according to claim 17, wherein the electronically controlled actuator is operable to hold the electronically controlled member into a plurality of intermediate positions between an open position in which the electronically controlled member leaves the conduit open and a closed position in which the electronically controlled member closes the conduit.

19. An irrigation control system according to claim 17, wherein the electronically controlled actuator is operable to hold the electronically controlled member in its respective position without requiring external power.

20. An irrigation control system according to claim 19, wherein the electronically controlled actuator comprises a bi-directional ratchet means.

21. An irrigation control system according to claim 13, wherein the electronically controlled actuator comprises a position sensor for sensing the position of an output of the electrically driven element, the position sensor connected to the electronic controller.

22. An irrigation control system according to claim 13, wherein the electronically controlled actuator comprises an electro-active polymer that expands in the presence of an electric field and contracts when the field is removed.

23. An irrigation control system according to claim 13, wherein the valve comprises a housing having a point at its bottom end, a chamber connected to the inlet, a chamber connected to the outlet, and a removable cartridge mounting the moisture sensitive element, the moisture controlled member, the electronically controlled member, the electronically controlled actuator, and the controller.

24. An irrigation control system according to claim 13, wherein a computer is connected to a communication node that is operable to communicate with a communication node in the field that communicates with the irrigation controller of the irrigation valve.

* * * * *